(12) United States Patent  
Taylor

(10) Patent No.: US 6,477,987 B2  
(45) Date of Patent: Nov. 12, 2002

(54) METHOD AND APPARATUS FOR RELOCATING LIVE POULTRY

(76) Inventor: John S. Taylor, 4660 Overlook La., Blairsville, GA (US) 30512

( * ) Notice: Subject to any disclaimer, the term of this patent is extended or adjusted under 35 U.S.C. 154(b) by 0 days.

(21) Appl. No.: 09/838,948

(22) Filed: Apr. 20, 2001

(65) Prior Publication Data

US 2002/0029750 A1 Mar. 14, 2002

Related U.S. Application Data

(60) Provisional application No. 60/199,724, filed on Apr. 20, 2000.

(51) Int. Cl.$^7$ ............................................. A01K 29/00
(52) U.S. Cl. ..................... 119/843; 119/713; 119/844; 119/845
(58) Field of Search .................. 119/713, 840–849; 198/312, 313, 461.3, 812

(56) References Cited

U.S. PATENT DOCUMENTS

| | | | | |
|---|---|---|---|---|
| 4,037,565 A | * | 7/1977 | Ledwell, Jr. ................... | 119/82 |
| 4,301,769 A | | 11/1981 | Mola | |
| 4,380,969 A | * | 4/1983 | Thomas ......................... | 119/82 |
| 4,499,856 A | * | 2/1985 | Hecht et al. ................... | 119/82 |
| 4,813,526 A | * | 3/1989 | Belanger ...................... | 198/313 |
| 5,385,117 A | * | 1/1995 | Hollis et al. ................. | 119/846 |
| 5,469,815 A | | 11/1995 | Stross | |
| 5,476,353 A | * | 12/1995 | Mola ........................... | 414/373 |
| 5,699,755 A | | 12/1997 | Wills et al. | |
| 5,743,217 A | * | 4/1998 | Jerome, II .................... | 119/846 |
| 5,902,089 A | | 5/1999 | Sinn et al. | |
| 5,915,338 A | * | 6/1999 | Fitzsimmons et al. ....... | 119/846 |
| 6,109,215 A | * | 8/2000 | Jerome, I ..................... | 119/843 |
| 6,305,327 B1 | * | 10/2001 | Bounds, Jr. ................... | 119/713 |

* cited by examiner

Primary Examiner—Charles T. Jordan  
Assistant Examiner—Bret C Hayes  
(74) Attorney, Agent, or Firm—Kenneth S. Watkins, Jr.

(57) ABSTRACT

A method and apparatus is disclosed for transporting a large number of live poultry from one location to another. Using a tray, the birds are loaded and transported to the new location where the tray is lifted upward and/or laterally into a position for unloading which is convenient relative to the features present at the new location. When the apparatus reaches the new location, a gate on the leading edge of the tray is opened and the birds are forcibly moved across the floor of the tray through the open gate and into the desired location. Movement of the birds is caused in one disclosed embodiment by equipping the tray with a slippery floor and tilting the tray toward the open gate. In one alternative disclosed embodiment, movement of the birds is caused by equipping the floor of the tray with a conveyor belt and a rake to gently push the birds toward the open gate. In this manner, the time and rigor of the manual labor required to accomplish the task of relocating the birds is reduced, thereby improving the overall efficiency of the relocation task. This method and apparatus also reduce the physical stress on the birds caused by repeated manual handling, thereby improving overall bird health and reducing the delay in the onset of egg laying caused by the relocation task. In our disclosed embodiment, the portable apparatus is powered by motive means, equipped with a steering mechanism, and designed to fit between the rows of a standard commercial poultry house. According to the disclosed embodiment, the tray is manipulated using hydraulic cylinders.

23 Claims, 12 Drawing Sheets

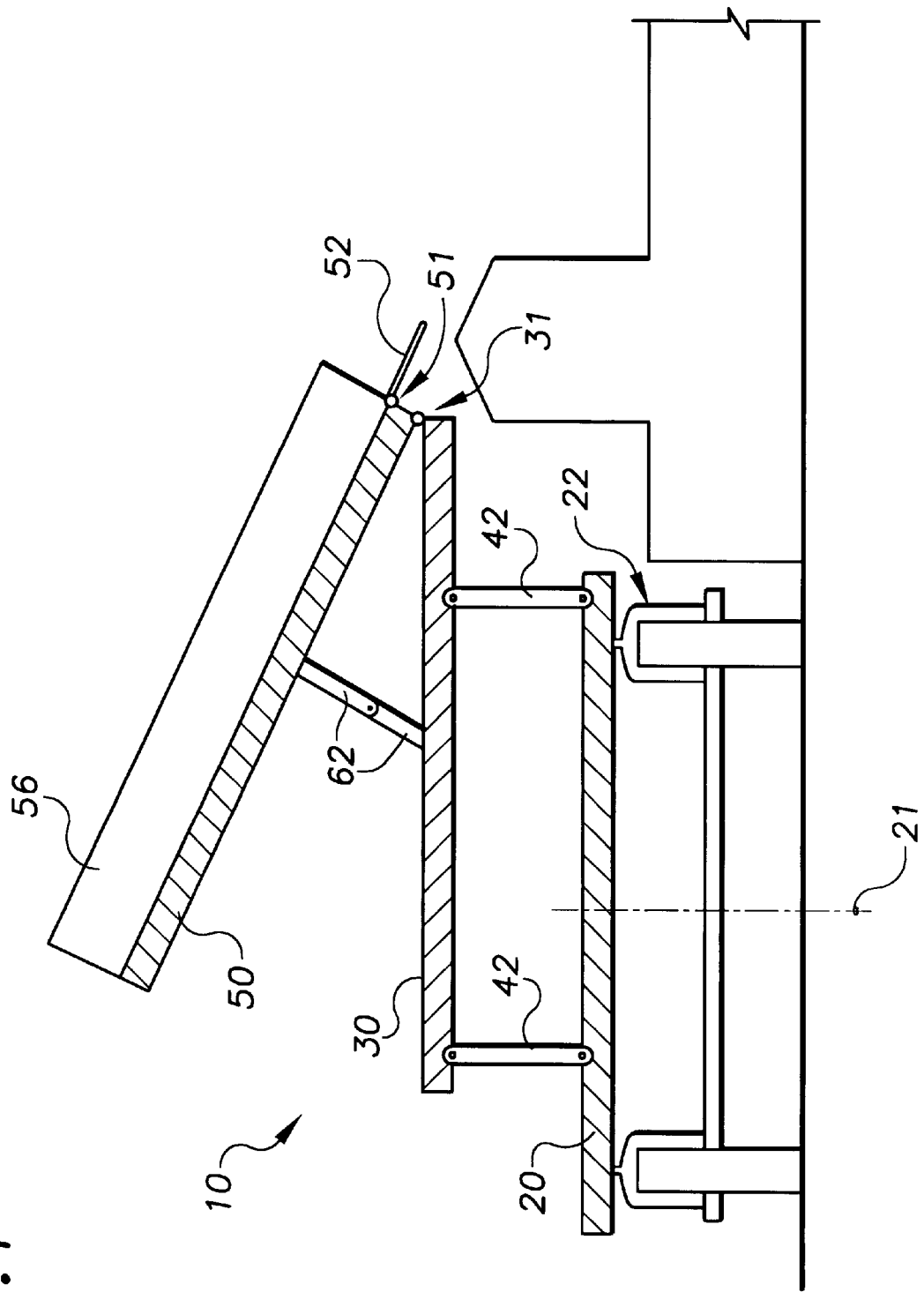

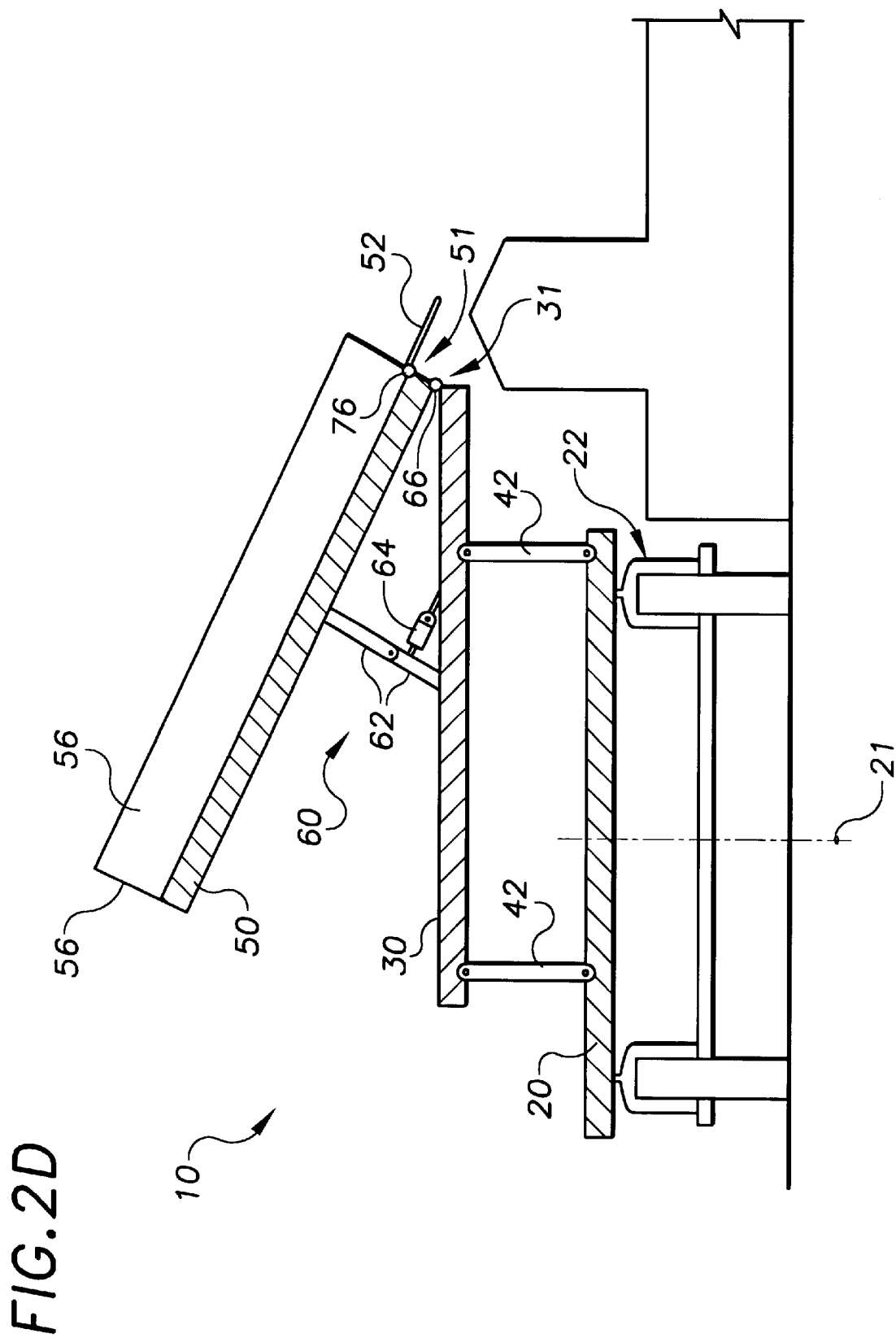

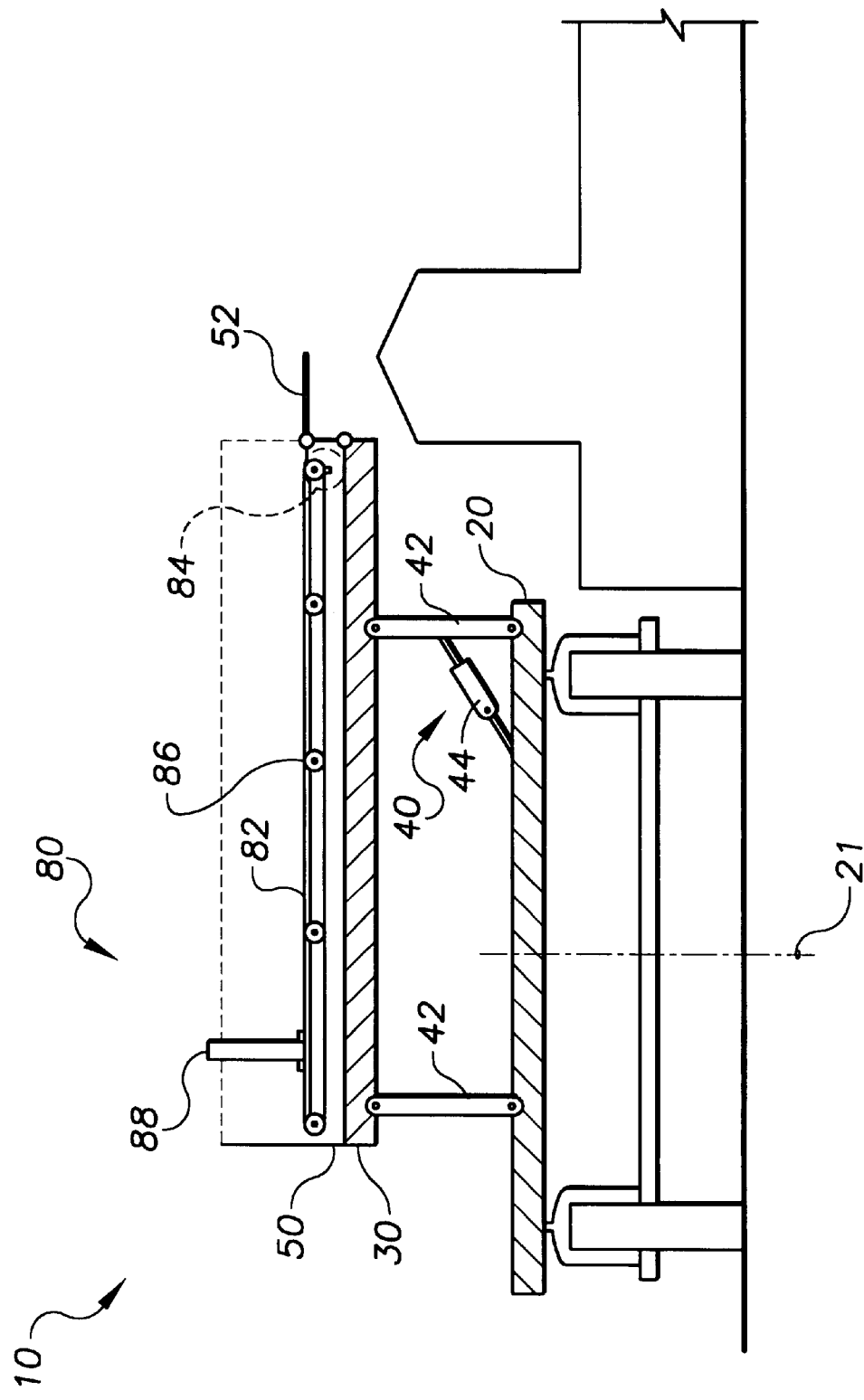

METHOD AND APPARATUS FOR RELOCATING LIVE POULTRY

RELATED APPLICATIONS

This application claims the benefit and priority of pending Provisional Application Serial No. 60/199,724, filed on Apr. 20, 2000, the entirety of which is incorporated herein by reference.

TECHNICAL FIELD

The present invention relates to a method and apparatus for handling poultry. More specifically, the invention relates to a method and apparatus that employs a portable tray to transport live chickens from one area or facility to another.

BACKGROUND OF THE INVENTION

Commercial poultry farming involves the use of multiple houses where the birds are raised in a particular environment during each phase of development. For example, young chickens known as pullets are raised together in a pullet house until they reach a certain age or maturity, when they are transported to a breeder house. The task of moving the birds from one house to another consumes resources which are limited by a variety of business factors including time, labor cost, facility size, and transportation distance. The task of relocating the birds is further limited by a variety of natural and environmental factors including temperature, light, nutrition, hydration, bird maturity, and overall bird stamina.

Relocating large numbers of live poultry by hand requires many hours of manual labor and results in significant physical stress to the birds.

Using manual labor to relocate the birds is expensive and diverts worker effort and attention away from more sophisticated tasks. Using manual labor to relocate the birds further results in repeated and stressful manual handling of the birds, which can delay the onset of egg, laying. Using manual labor to relocate the birds also takes a long time because a person can only carry a limited number of birds. The slow process of manually picking up the birds from ground level and placing on the platform results in many of the birds returning to the flocks still on the ground, necessitating multiple relocations of the birds. The inherent delay caused by using manual labor can result in the birds being without food or water for up to two or three days, resulting in adverse effects upon bird health and further delaying the onset of egg laying.

In addition, the feeders in each type of hen house are different in size and shape, which requires the birds to be located on different levels relative to the feeders. For example, pan or chain feeders are used in a pullet house, whereas auger, chain or pan feeders are used in a breeder house. The pan feeder is necessary for proper development and it is designed to produce a more uniform bird. The auger feeder, however, requires locating the birds on a raised platform where they can gain access to the feed.

The breeder house also contains a row of nests where the birds lay eggs. For convenience in the gathering of eggs, the nest rows are typically located adjacent to a center aisle, with the raised platform located behind the nest rows. This rearward location of the raised platform increases the difficulty of accurately and carefully locating the birds over the nest row and onto the platform.

Thus, there is a need for a poultry relocation apparatus and method which provides a reduced amount of manual labor and minimizes stress to the birds.

There is a further need for a poultry relocation apparatus and a method for using same which provides a means for lifting the birds gently over the nest row and accurately onto a raised platform.

SUMMARY OF THE INVENTION

Stated generally, the present invention comprises a method and apparatus for relocating large numbers of live poultry.

Using a portable tray, the birds are loaded into the tray and transported to a new location. In one disclosed embodiment, this transportation is accomplished by a rolling apparatus which is self-propelled and fits between the rows of a typical breeder house.

When the birds are transported to the desired location, the tray is lifted upward and at the same time moved laterally into a convenient position by a motor. In one disclosed embodiment, this translation of the tray to its elevated and offset position is accomplished by a raising apparatus which is driven by a hydraulic cylinder. In one alternative disclosed embodiment, the tray is not lifted upward and the translation of the tray to its offset position is accomplished by a rolling apparatus which is driven by a hydraulic cylinder.

When the tray has been lifted into the elevated and offset position, a gate on the edge of the tray is opened to allow the birds to exit the tray toward the desired location. In one disclosed embodiment, the opening of the gate is accomplished by a hydraulic cylinder.

When the tray has been lifted and the gate has been opened, the tray is maneuvered for the purpose of moving the birds off the tray, through the open gate, and into the desired location. In one disclosed embodiment, a hydraulic cylinder is used to tilt the tray toward the open gate, causing the birds to slide across the floor of the tray and onto the raised platform of a typical breeder house. In one alternative embodiment, a conveyor is used to move the floor of the tray toward the open gate, moving the birds out of the tray and onto the raised platform of a typical breeder house.

According to one aspect of the invention, the portable apparatus is moved into position and a large number of birds are loaded into the tray by the operator. This method and apparatus increases the number of birds to be relocated per trip to the new location and eliminates the need for as many trips, thereby improving the carrying capacity per employee and reducing the time consumed by the entire relocation task.

In a second aspect of the invention, the loaded portable apparatus is moved to the new location where the operator controls the precise desired location of the birds. This method and apparatus eliminates the haphazard manual placement of the birds and eliminates the repeated manual handling of the birds, thereby improving the accuracy of bird placement and reducing the adverse impact of relocation on bird health.

In another aspect of the invention, the secondary frame under the tray containing the birds is lifted upward and at the same time moved laterally into an elevated and offset position above the nest row. This method and apparatus eliminates hours of manual lifting of each bird over the nest row, thereby improving the overall efficiency of the relocation task and reducing labor costs as well as the risk of injury.

In yet another aspect of the invention, a gate on the edge of the tray is opened, allowing the birds to exit the tray toward the desired location. This method and apparatus eliminates the need to manually direct the birds toward the desired location, thereby reducing bird stress and improving overall bird health.

In a further aspect of the invention, the tray is maneuvered to unload the birds off the tray, through the open gate, and into the desired location. This method and apparatus eliminates the repeated manual handling of the birds, thereby reducing the time required for unloading and improving overall bird health.

In yet another aspect of the invention, the floor of the tray is constructed of a material which is sufficiently slippery to allow the birds to slide easily when the tray is tilted at a relatively low angle. Alternatively, the floor of the tray is configured with a belt conveyor which unloads the birds without tilting the tray. This method and apparatus reduces the angle to which the tray is tilted, or eliminates the tilting altogether, thereby allowing said apparatus to be operational in a smaller environment. This method and apparatus in either embodiment eliminates the need to manually push the birds through the open gate, thereby reducing the time required for unloading and improving overall bird health.

Thus, it is an object of the present invention to provide an improved method and apparatus for relocating large numbers of live poultry.

It is another object of the present invention to provide an improved method and apparatus for relocating large numbers of live poultry wherein the procedure both reduces the time and rigor of the manual labor required and reduces the physical stress on the birds caused by repeated manual handling.

Still another object of the present invention is to provide an improved method and apparatus for relocating large numbers of live poultry wherein the procedure both reduces the time and rigor of the manual labor required and reduces the physical stress on the birds caused by repeated manual handling while also providing a reduced delay in access to food and water and a reduced delay in the onset of egg laying caused by the relocation.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 1 is a rear elevation view of the apparatus with the secondary frame in its elevated and offset position and the tray in its tilted position with the gate open, performing the method of the present invention.

FIG. 2A is a rear elevation view of the apparatus with the secondary frame in its closed position and the tray in its closed position with the gate closed. FIG. 2B is a rear elevation view of the apparatus with the secondary frame in its elevated and offset position. FIG. 2C is a rear elevation view of the apparatus with the gate open. FIG. 2D is a rear elevation view of the apparatus with the gate open and the tray in its tilted position. FIG. 2E is a sectional view of the apparatus through the floor of the tray showing the conveying apparatus.

FIG. 3a is a front elevation view of the prototype apparatus being loaded. FIG. 3B is a front elevation view of the prototype apparatus in its loaded condition. FIG. 3C is a front elevation view of the prototype apparatus being unloaded using a conveyor and lateral positioner for the tray.

DETAILED DESCRIPTION OF THE PREFERRED EMBODIMENT

Figure 2A:
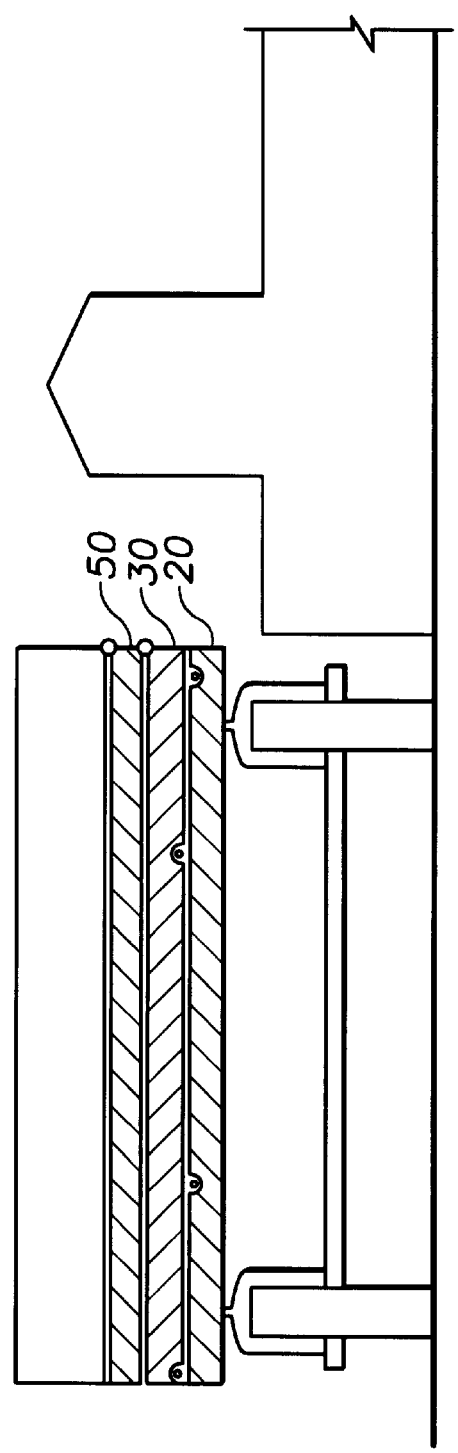
FIGS. 2A, 2B, and 2C, along with FIG. 2D or FIG. 2E, depict a progressive series of operating positions.

Referring in more detail to the drawings, in which like numerals indicate like elements throughout the several views, FIG. 1 illustrates an apparatus 10 for transporting a large number of live poultry from one location to another in a tray 50 having side walls 56 and a gate 52. In one disclosed embodiment, the apparatus 10 is designed to fit between the rows of a standard commercial poultry house.

The main frame 20 of the apparatus 10 has a substantially vertical center axis 21 and is supported by a rolling support assembly 22. In one disclosed embodiment, the rolling support assembly 22 has four wheels and is powered by a motor.

The secondary frame 30 of the apparatus 10 is supported by pivotably attached linkages 42 to said main frame 20 and configured to raise upward and at the same time move laterally relative to said center axis 21 of said main frame 20. Said secondary frame 30 has a substantially horizontal edge axis 31 along the edge most laterally distant from said center axis 21 of said main frame 20. In one disclosed embodiment, the pivotably attached linkages 42 are designed such that the secondary frame 30 is raised a height of approximately twenty-four inches and at the same time moved laterally a distance of approximately twenty-four inches relative to said center axis 21 of said main frame 20.

The tray 50 has a leading edge axis 51 and is supported by secondary frame 30. In one disclosed embodiment, the tray 50 is supported by pivotably attached linkages 62 to said secondary frame 30 and configured to tilt by rotating about an axis parallel to said edge axis 31 of said secondary frame 30. In one alternative disclosed embodiment, tray 50 is equipped with a conveying apparatus 80, as shown in FIG. 2E, configured with a belt 82 positioned adjacent the floor, driven by a motor 84 across a plurality of rollers 86, and further equipped with a rake 88 configured to push the birds across the tray 50 and toward the open gate 52. In one disclosed embodiment, the tray 50 is approximately eight feet wide by approximately eleven feet long by approximately twelve inches deep.

The gate 52 is pivotably attached along the said leading edge axis 51 of said tray 50 and configured to rotate about an axis parallel to said leading edge axis 51 of said tray 50. In one disclosed embodiment, the gate 52 is approximately twelve inches high and extends the full length (approximately eleven feet) of the tray 50.

FIGS. 2A, 2B, 2C, and 2D depict a progressive series of operating positions which illustrate the apparatus 10 for carrying out the method disclosed herein for transporting a large number of live poultry from one location to another. FIGS. 2A, 2B, 2C, and 2E also depict a progressive series of operating positions which illustrate the apparatus 10 for carrying out the method disclosed herein.

FIG. 2A illustrates the apparatus 10 in its neutral or closed position. In one disclosed embodiment, when the apparatus 10 is closed, secondary frame 30 rests in a position aligned with main frame 20 and tray 50 rests in a position aligned with secondary frame 30.

Figure 2B:
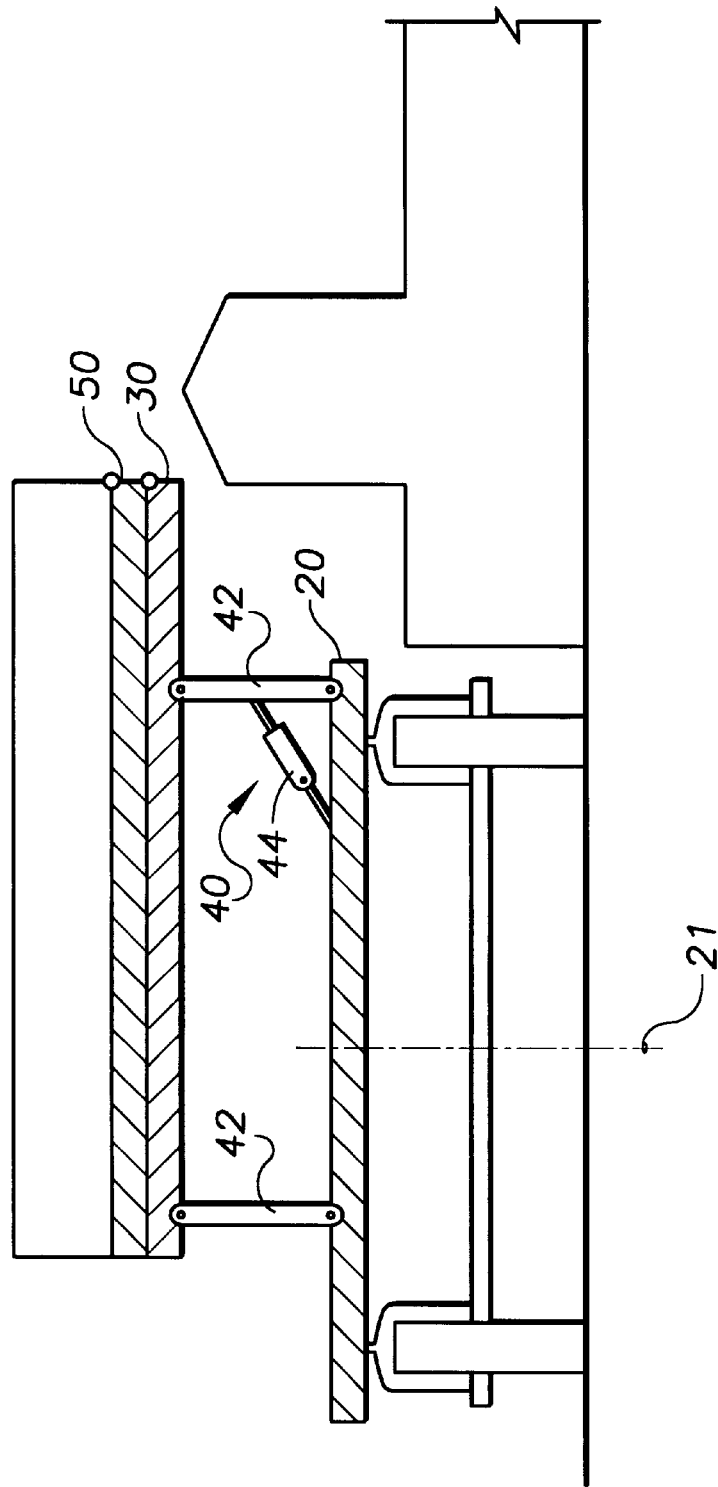

FIG. 2B illustrates the apparatus 10 with the secondary frame 30 in its elevated position offset laterally from center axis 21. The raising apparatus 40 is fixably mounted to main frame 20 and includes pivotably attached linkages 42 and a motor 44.

Figure 2C:
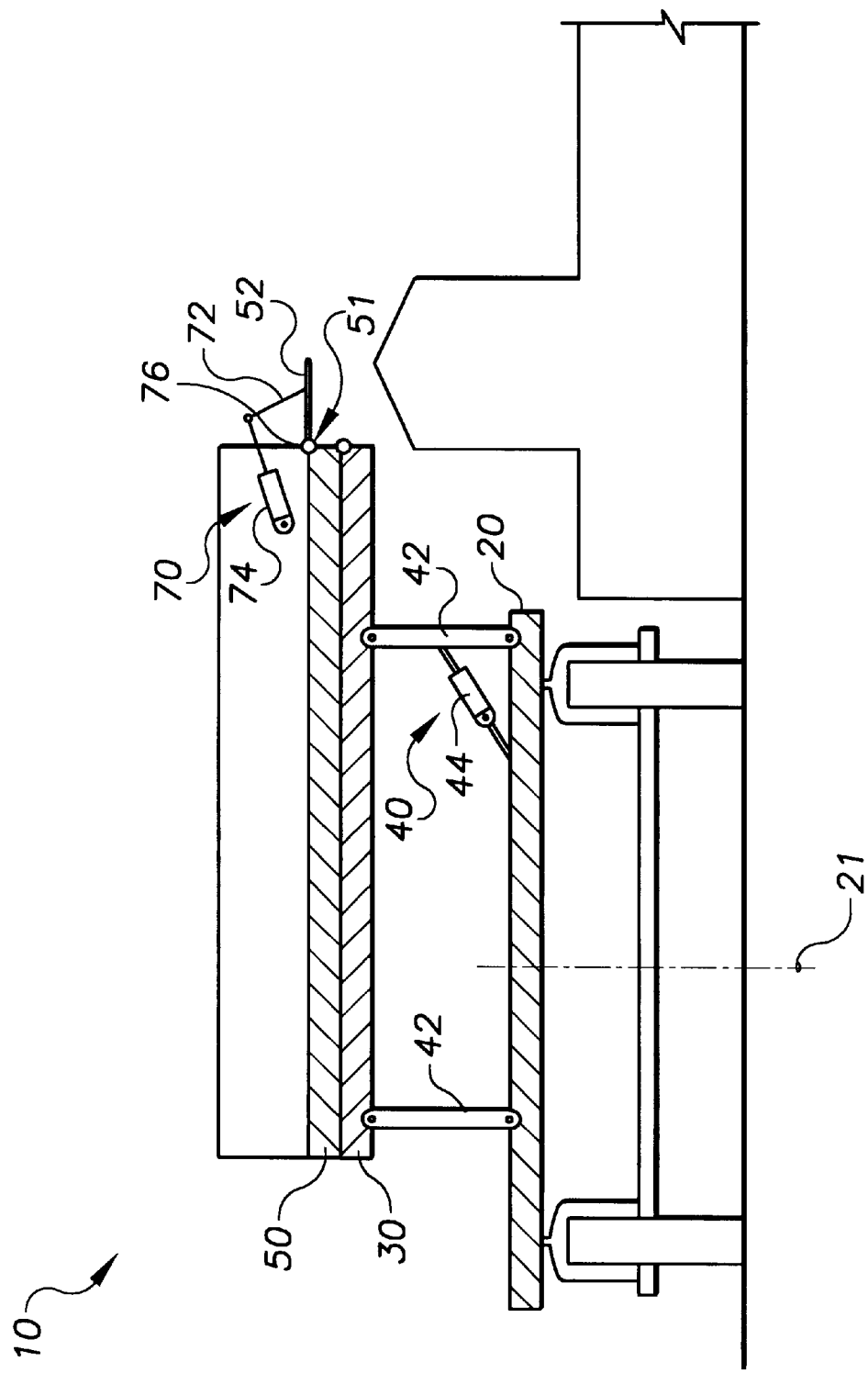

FIG. 2C illustrates the apparatus 10 with the secondary frame 30 in its elevated and offset position and with the gate 52 open. The gate-opening apparatus 70 is fixably mounted to tray 50 and includes pivotably attached linkages 72, a motor 74, and a pivot/hinge 76. The leading edge axis 51 runs through the center of pivot/hinge 76.

FIG. 2D illustrates the apparatus 10 with the secondary frame 30 in its elevated and offset position and with the gate 52 open and with the tray 50 in its tilted position. The tilting apparatus 60 is fixably mounted to secondary frame 30 and includes pivotably attached linkages 62, a motor 64, and a pivot/hinge 66. The edge axis 31 runs through the center of pivot/hinge 66.

FIG. 2E illustrates the apparatus 10 with the secondary frame 30 in its elevated and offset position and with the gate 52 open. The conveying apparatus 80 is fixable mounted to secondary frame 30 and includes a belt 82, a motor 84, a plurality of rollers 86, and a rake 88.

Figure 3A:
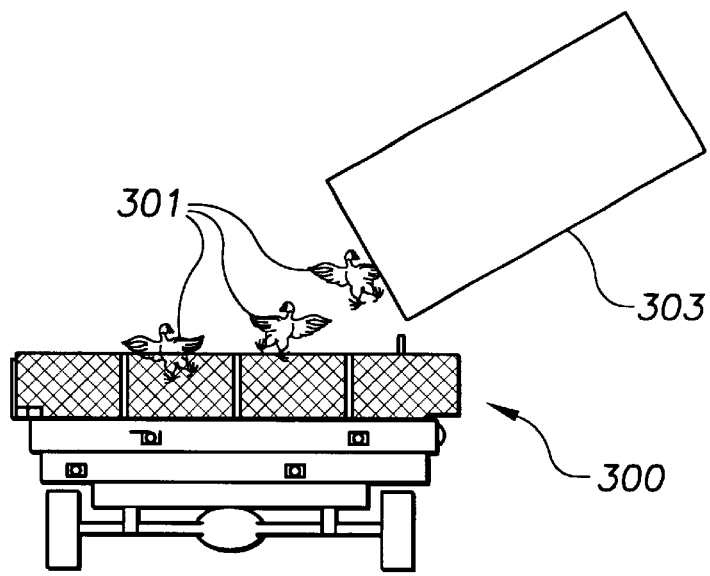
FIGS. 3A, 3B, and 3C, are perspective views of a prototype of the apparatus performing the method of the present invention.
Figure 3B:
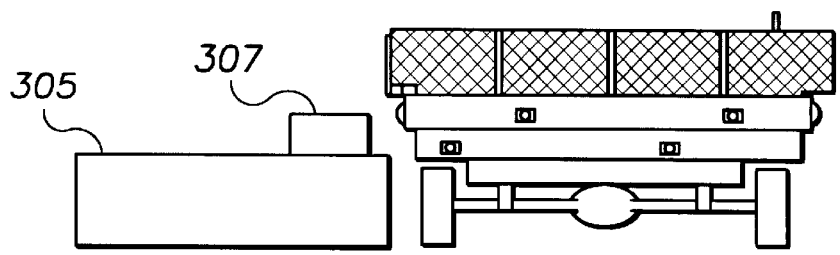
Figure 3C:
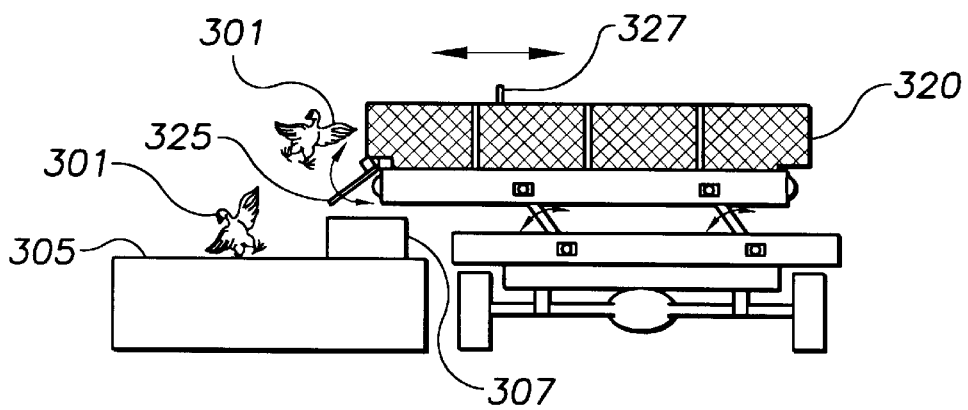

FIGS. 3A–3C are front elevation views the apparatus performing the method of the present invention. In FIG. 3A, live poultry 301 is being loaded from a cage or transportation container 303 into the open-topped tray of the apparatus 300, and the poultry is confined to the tray by the front fence, rear fence, rake and side gate of the apparatus as described in the following sections. FIG. 3B is a front elevation view of the apparatus positioned beside a raised platform 305 and hen nest 307. FIG. 3C is a front elevation view of the laterally positionable tray assembly 320 positioned laterally and vertically to clear nest 307. The live poultry 301 is discharged from the side gate 325 of the apparatus by a rake 327 and tray assembly described in the following sections. In an alternative embodiment, the poultry is discharged by the tilt apparatus of FIG. 2D.

Figure 4:
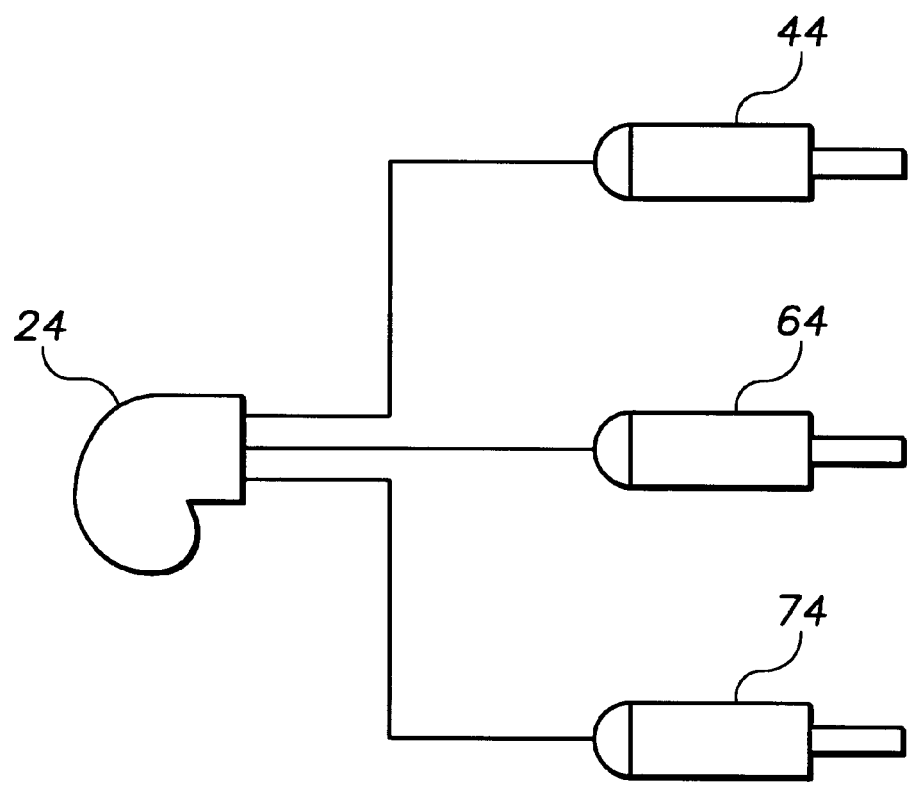
FIG. 4 is a schematic diagram of the main hydraulic system and its functional relationship to the motor for the raising apparatus, the motor for the gate-opening apparatus, and the motor for the tilting apparatus or the conveying apparatus.

FIG. 4 is a schematic diagram of the main hydraulic system 24 and its functional relationship to the motor 44 for the raising apparatus 40, the motor 64 for the tilting apparatus 60 (or, alternatively, the motor 84 for the conveying apparatus 80), and the motor 74 for the gate-opening apparatus 70. In one disclosed embodiment, the motors 44, 64, and 74 are hydraulic cylinders.

Figure 5:
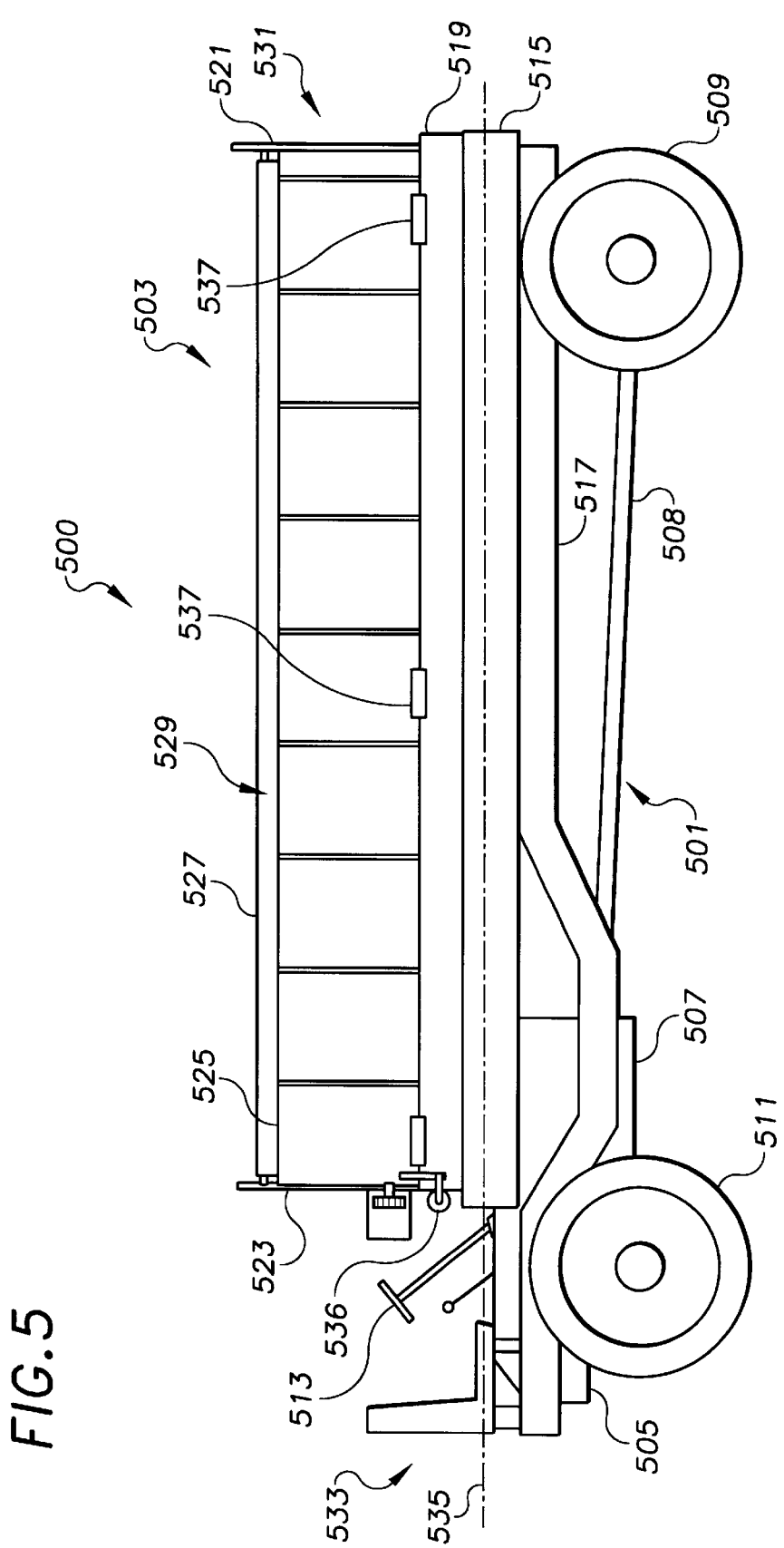
FIG. 5 is a side elevation drawing of the apparatus of the present invention having a laterally positionable tray assembly with a tray assembly supported by a rolling support assembly.

FIG. 5 is a side elevation of embodiment 500 of the apparatus of the present invention comprising a rolling support assembly 501 and a laterally positionable tray assembly 503. In the preferred embodiments, rolling support assembly 501 is a driven vehicle. The rolling support assembly comprises a vehicle drive such as motor 505 and transmission 507 coupled to, and driving, at least one drive wheel such as front wheels 509 via drive shaft 508 and differential 510 of FIG. 6A. In other embodiments, motor 505 and transmission 507 drive rear wheels 511.

A steering assembly such as steering wheel and box assembly 513 is coupled to rear wheels 511 to provide maneuvering of rolling support assembly 501. In other embodiments, steering assembly 513 is coupled to front wheels 509. Rolling support assembly 501 comprises a first or primary frame 515 which is attached to chassis 517.

Figure 7:
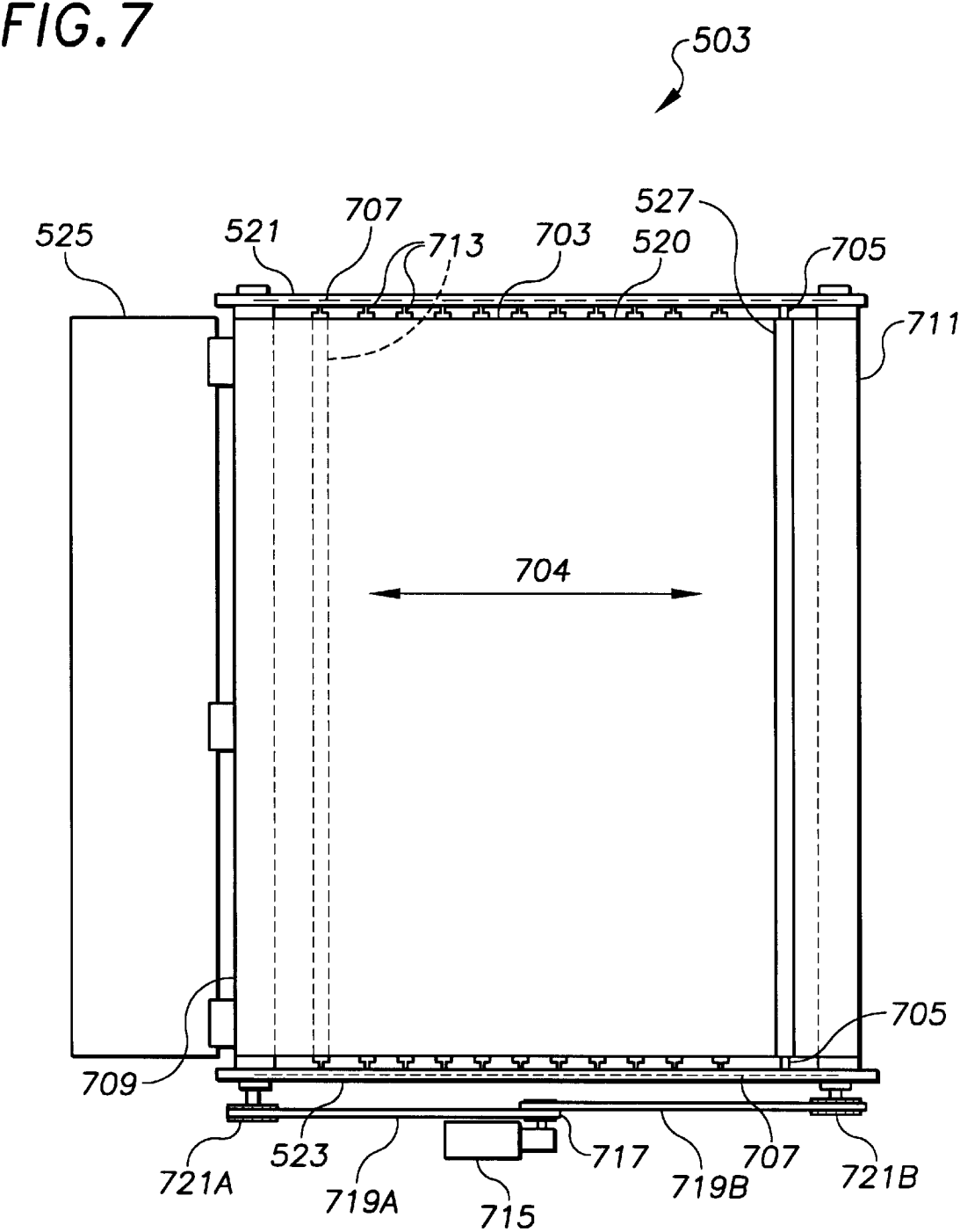
FIG. 7 is a top view of the laterally positionable tray assembly of the embodiment of FIG. 5 showing the conveyor, conveyor belt, conveyor rake and associated support and drive components.

Tray assembly 503 comprises a laterally positionable frame such as secondary frame 519 supporting conveyor 520 of FIG. 7, front panel or fence 521, rear fence 523, side gate 525 and conveyor rake 527. Conveyor 520, and wall elements comprising front fence 521, rear fence 523, side gate 525 and conveyor rake 527 define an open-top tray 529 for confining a plurality of live poultry during loading, transporting and unloading of the poultry. The fence, gate (normally closed) and rake portions comprise a height above conveyor belt 703 of FIG. 7 sufficient to prevent escape of live poultry during loading, transport and unloading evolutions. In the preferred embodiments, the height of the wall elements is at least 12". In other embodiments, the height of the wall elements is at least 24 inches to allow the maximum number of birds per load and still prevent escape of the birds. In other embodiments, for example for small birds or chicks, the height of the wall elements is at least 4 inches to prevent the live poultry from escaping the tray. For large poultry, such as turkeys, the height of the wall elements may be up to 60 inches or more. The height of the wall elements may be modified as suitable for the size of the poultry being transported.

The front 531 and back 533 of rolling support assembly 501 define longitudinal axis 535. Actuator 536 pivots side gate 525 about hinges 537 to open and close side gate 525.

Figure 6A:
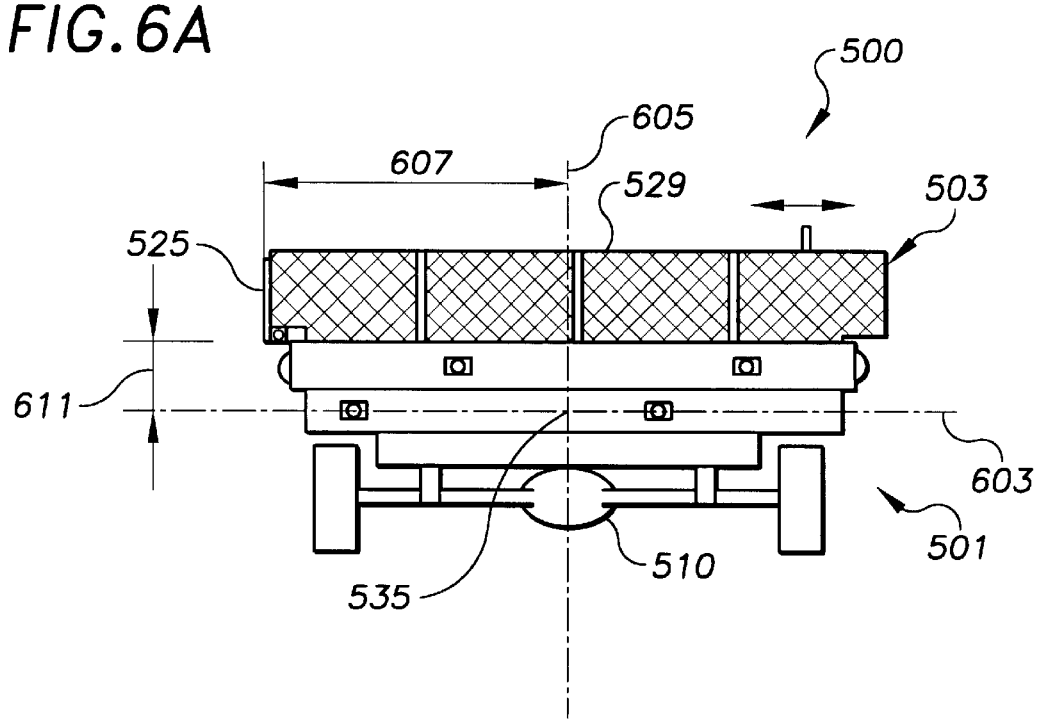
FIG. 6A is front elevation drawing of the apparatus of FIG. 5.
Figure 6B:
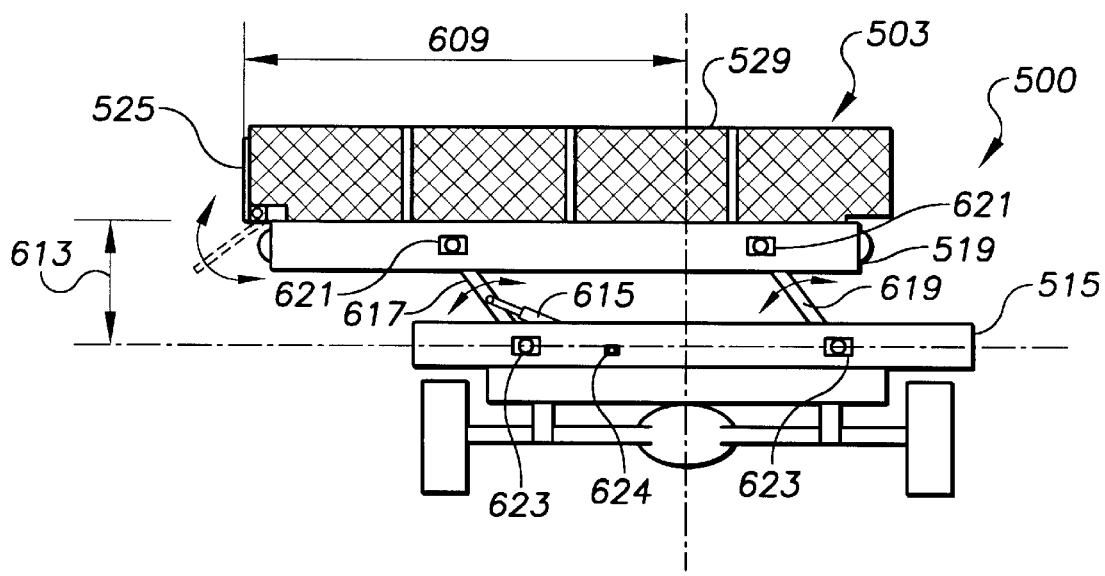
FIG. 6B is a front elevation drawing of the apparatus of FIG. 5 in an extended position with the laterally positionable tray assembly laterally and vertically extended with respect to the rolling support assembly.

FIG. 6A is a front-end view of embodiment 500 of the apparatus showing the horizontal lateral 603 and vertical 605 axes of rolling support assembly 501. Laterally positionable tray assembly 503 is in the retracted position with respect to rolling support assembly 501. FIG. 6B is a frontend view of embodiment 500 of the apparatus showing laterally positionable tray assembly 503 in the extended position with respect to rolling support assembly 501. In the extended position of FIG. 6B, side gate 525 of tray assembly 503 is extended laterally with respect to rolling support assembly 501 as shown by lateral extensions 607 of FIG. 6A and 609 of FIG. 6B.

In the preferred embodiments, the height of tray assembly 503 is extended vertically with respect to rolling support assembly 501 as shown by vertical extension 611 of FIG. 6A and vertical extension 613 of FIG. 6B. Actuator 615 translates tray assembly 503 laterally and vertically by actuated link 617 and idler link 619. Links 617 and 619 are pivotally supported by bushings 621 in secondary frame 519 of tray assembly 503 and bushings 623 of primary frame 515 of rolling support assembly 501. Bushing 624 supports actuator 615 end to primary frame 515. Only the front actuator, links, bushings and frame elements are shown. Two additional links and associated components in the rear of the apparatus are similar as described in previous embodiments.

Actuator 615 and links 617 and 619 of FIG. 6B comprise a lateral positioner, which laterally positions tray 529 of tray assembly 503 with respect to the longitudinal axis of the rolling support assembly over the nests of a hen house and to allow discharge of the birds on the desired location of the raised platform of FIG. 3C. In the retracted position, the apparatus can transit the isles to the desired location without interference with obstructions. Conveyor 520 and rake 527 provides a gentle and positive means to discharge live poultry from open-top tray 529 in a direction lateral to the longitudinal axis of the rolling support assembly to the desired discharge site. Actuator 615 and links 617 and 619 also comprise a vertical positioner for tray assembly 503 to position conveyor 520 over obstructions such as the nest housings.

FIG. 7 is a top view of the laterally positionable tray assembly 503 showing conveyor belt 703 of conveyor 520. Secondary frame 519 is omitted for clarity. Side gate 525 is shown in the lowered position as shown in the phantom lines of FIG. 6B. Conveyor rake 527 is attached to belt 703 and is supported by pins 705 in track 707 of front fence 521 and rear fence 523. Belt 703 is translated laterally as shown by arrow 704 by winding alternatively on discharge side drive roll 709 and retract drive roll 711. Belt 703 is supported vertically by idler support rollers 713. Drive rolls 709 and 711 are driven by motor-reducer 715 through double sprocket 717, chains 719A and 719B, and clutch-sprockets 721A and 721B. In the preferred embodiments, motor-reducer 715 is a brake motor-reducer. By energizing forward or reverse windings of motor-reducer 715 and energizing the appropriate roll 709 and 711 clutch sprockets, conveyor belt 703 is driven in the desired direction to discharge the birds or, alternatively, to retract belt 703.

Figure 8A:
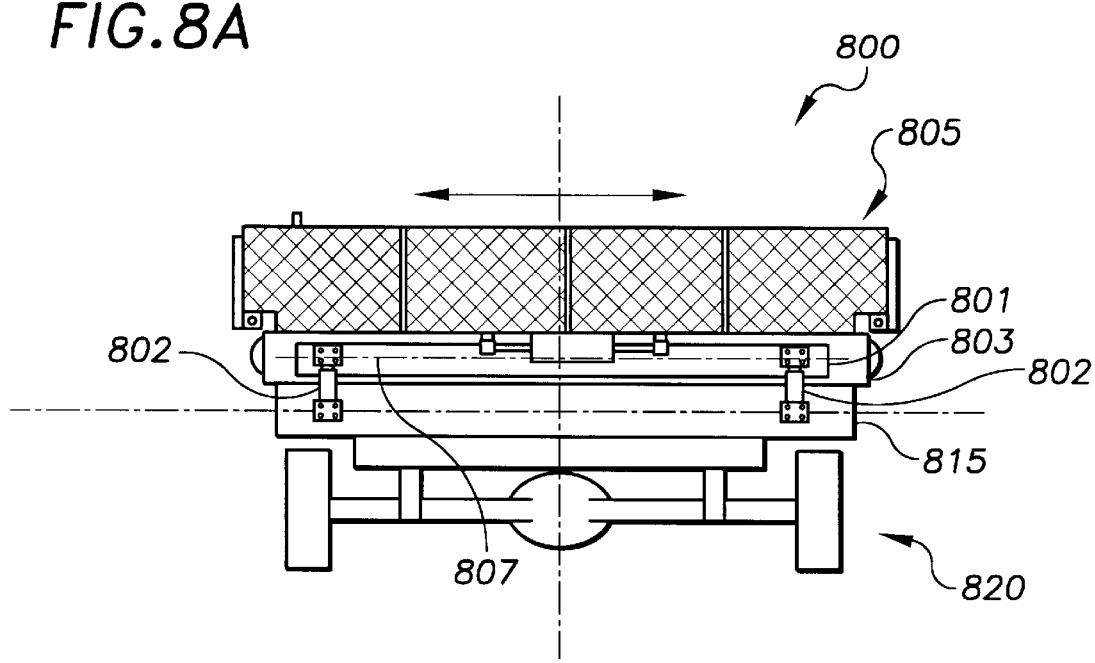
FIG. 8A is a front elevation drawing of an alternative embodiment of the apparatus showing a laterally positionable tray assembly with discharge gates on either side of the tray assembly.

FIG. 8A is a front elevation drawing of alternative embodiment 800 of the present invention showing an auxiliary frame 801 supported from primary frame 815 by vertical actuators 802. Auxiliary frame 801 supports secondary frame 803 of laterally positionable tray assembly 805 in a sliding manner by longitudinal track assembly 807. Vertical positioners or actuators 802 may be hydraulic cylinders, or they may be screw actuators or other linear actuators known in the art. Only the front actuators, auxiliary frame and secondary frame are shown, the rear actuators and frames are similarly positioned on the rear end of the apparatus.

Figure 8B:
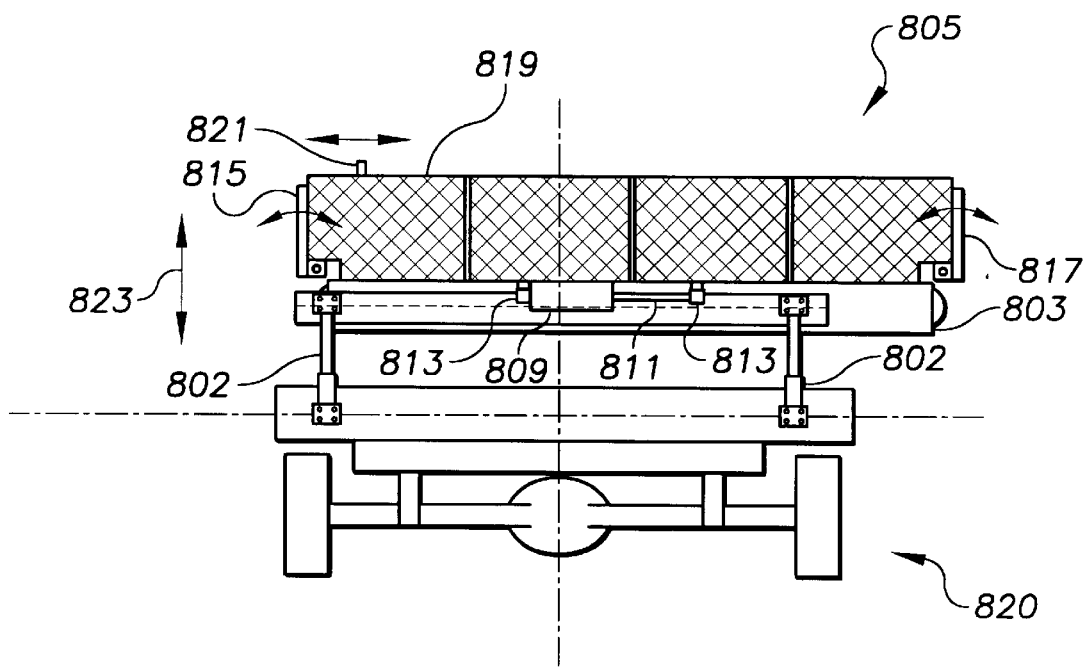
FIG. 8B is a front elevation drawing of the embodiment of FIG. 8A with a double-acting actuator translating the tray assembly in one of the two possible directions, the other direction being an opposite lateral direction.

FIG. 8B is a front elevation showing tray assembly 805 positioned laterally to the right by two-way actuator 809. In one embodiment, actuator 809 is a double-acting cylinder fixed to auxiliary frame 801 with shaft 811 acting against stops 813 of secondary frame 803. Two-way actuator 809 provides motive force for positioning secondary frame 803 of tray assembly 805 laterally to either side with respect to rolling support assembly 820. Side gates 815 and 817 are positionable open and shut similar to gate 525 of the embodiment of FIG. 6A and 6B to allow discharge of live poultry from either side of tray 819. The actuators for side gates 815 and 817 are omitted for clarity. In this embodiment, both tray assembly 805 and rake 821 of tray assembly 805 are positionable in both lateral directions. This embodiment allows positioning and discharge of live poultry to either side of the apparatus.

Vertical actuators 802 provide adjustment of the vertical height 823 of tray assembly 805. In other embodiments, vertical actuators 802 are replaced by fixed supports. In still other embodiments, roller assemblies or other linear guides are utilized instead of track assembly 807.

In the preferred embodiments, the amount of lateral extension provided by the lateral positioner or actuator of the apparatus is at least 8 inches to provide horizontal clearance of the discharge gate of the tray assembly with respect to the desired placement area outboard of the nests. In the more preferred embodiments, the lateral extension provided by the lateral actuator is at least 12 inches, and in the still more preferred embodiments, the lateral extension is at least 24 inches. In some embodiments, the lateral extension is between 24 and 48 inches.

In the preferred embodiments, the amount of vertical extension provided by the vertical positioner or actuator of the apparatus is at least 8 inches to provide vertical clearance of the discharge gate of the tray assembly with respect to the desired placement area outboard of the nests. In the more preferred embodiments, the lateral extension provided by the vertical actuator is at least 12 inches, and in the still more preferred embodiments, the vertical extension is at least 24 inches. In some embodiments, the vertical extension is between 24 and 48 inches. In still other embodiments, the vertical position of the tray assembly is fixed with respect to the rolling support assembly, or the vertical clearance may be adjusted by manual adjustments.

In other embodiments, the vertical and lateral positioners or actuators may be linear actuators such as pneumatic or hydraulic cylinders, rack and pinion sets, lever assemblies, bell and crank assemblies, jack screws, recirculating ball mechanisms, ratchet assemblies, scissor assemblies, or other manual or power actuators and positioners known in the art. The conveyor of FIG. 7 which alternately winds a length of conveyor belt around rolls on opposite ends may be replaced by a conveyor comprising a continuous loop belt, such as that shown in FIG. 2E.

In a still further embodiment, the tray assembly of the apparatus is rotated 90 degrees about a vertical centerline with respect to the rolling support assembly to allow discharge from the front or rear of the apparatus. The rolling support assembly may be a non-driven vehicle such as a trailer transported by a driven vehicle such as a tractor.

The method and apparatus of the present invention is useful for transporting and discharging large numbers of live poultry. For example, a full cage of over 400 adult hens may be quickly and safely transported and discharged to a new location in a single load. In other embodiments, the tray of the apparatus is sized to transport and discharge more than 25 birds. The method and apparatus may be used for any poultry of any size or age.

The method and apparatus for relocating live poultry as described provides new features and addresses the limitations of previous methods and apparatus by reducing labor and associated costs of relocating large numbers of live poultry. The method and apparatus reduces the stress resulting from relocation and reduces the time necessary for the live poultry to adjust to the new location, advancing the onset of egg production and improving the quantity and uniformity of egg production.

While this invention has been described in specific detail with reference to the disclosed embodiments, it will be understood that many variations and modifications may be effected within the spirit and scope of the invention as described in the appended claims.

I Claim:

1. An apparatus for transporting a plurality of live poultry from one location to another, said apparatus comprising:

a main frame having a substantially vertical center axis;

a secondary frame supported by pivotably attached linkages to said main frame and configured to raise upward and move laterally relative to said center axis of said main frame, said secondary frame having a substantially horizontal edge axis along the edge most laterally distant from said center axis of said main frame;

a tray having a leading edge axis and supported by said secondary frame and configured with a means for unloading toward an axis parallel to said edge axis of said secondary frame; and a gate pivotably attached to said leading edge of said tray and configured to rotate about an axis parallel to said leading edge axis of said tray.

2. The apparatus as claimed in claim 1, further comprising a means for moving, propelling, and steering said apparatus to allow it to travel substantially parallel to a longitudinal axis of said main frame.

3. The apparatus as claimed in claim 1, further comprising a means for raising said secondary frame and moving said secondary frame laterally relative to said center axis of said main frame, wherein said raising means comprises one or more motors fixably mounted relative to said main frame.

4. The apparatus as claimed in claim 1, further comprising a means for opening said gate about said leading edge of said tray, wherein said opening means comprises one or more motors fixably mounted relative to said tray.

5. The apparatus as claimed in claim 1, further comprising a means for tilting said tray about said edge axis of said secondary frame, wherein said tilting means comprises one or more motors fixably mounted relative to said secondary frame.

6. The apparatus as claimed in claim 1, further comprising a means for conveying the contents of said tray toward said edge axis of said secondary frame, wherein said conveying means comprises a moving surface.

7. A method for using an apparatus for relocating a plurality of live poultry, said method comprising the steps of:

a) positioning said apparatus adjacent said live poultry, said apparatus comprising:
  a rolling support assembly comprising a plurality of wheels configured to provide rolling support of the rolling support assembly, and a front portion and a back portion defining a longitudinal axis;
  a laterally positionable tray assembly operably connected to the rolling support assembly, the laterally positionable tray assembly comprising an open-top tray defined by walls of sufficient height to prevent escape of said plurality of live poultry, at least one of said walls being generally parallel to said longitudinal axis and comprising a discharge gate for discharging said plurality of live poultry;
  a lateral actuator operably attached to said laterally positionable tray assembly for displacing said laterally positionable tray assembly in a direction lateral to said longitudinal axis of said rolling support assembly, and
  a discharge actuator operably attached to the laterally positionable tray assembly for biasing said live poultry towards said discharge gate, b) loading said plurality of live poultry into said tray;

c) transporting said apparatus to a new desired location;

d) positioning said laterally positionable tray assembly laterally relative to said longitudinal axis of said rolling support assembly with said lateral actuator;

e) opening said discharge gate on said laterally positionable tray assembly; and f) actuating said discharge actuator to discharge said plurality of live poultry to said new desired location.

8. An apparatus for transporting and discharging a plurality of live poultry, said apparatus comprising:
  a rolling support assembly comprising a plurality of wheels configured to provide rolling support of the apparatus, and a front portion and a back portion defining a longitudinal axis;
  a laterally positionable tray assembly operably connected to the rolling support assembly, the laterally positionable tray assembly comprising an open-top tray defined by walls of sufficient height to prevent escape of said plurality of live poultry, at least one of said walls comprising a discharge gate extending parallel to said longitudinal axis for discharging said plurality of live poultry, and a conveyor, said conveyor comprising a belt defining a floor portion of said open-top tray and a conveyor drive for driving said belt in a direction lateral to said longitudinal axis of said rolling support assembly toward said discharge gate; and
  a lateral actuator operable attached to the laterally positionable tray assembly for displacing said laterally positionable tray assembly in a direction lateral to said longitudinal axis of said rolling support assembly.

9. The apparatus of claim 8 wherein the rolling support assembly comprises a drive operably connected to at least one drive wheel for propelling said apparatus in a direction parallel to said longitudinal axis, and a steering mechanism operably attached to at least one steerable wheel for steering said apparatus.

10. The apparatus of claim 8 comprising a vertical actuator operably connected between said rolling support assembly and said laterally positionable tray assembly for adjusting a height of said laterally positionable tray assembly relative to a horizontal axis of said rolling support assembly.

11. The apparatus of claim 8 wherein said discharge gate is a first gate disposed on a first side of said laterally positionable tray assembly, and said discharge gate extends essentially a full length of said open-top tray in a direction parallel to said longitudinal axis.

12. The apparatus of claim 8 wherein a second of said walls is a rake attached to said conveyor belt, said rake generally parallel to said discharge gate and translateable in a direction lateral to said longitudinal axis.

13. The apparatus of claim 8 wherein said discharge gate is a first discharge gate and said laterally positionable tray assembly comprises a second discharge gate disposed on a second side of said laterally positionable tray assembly opposite said first discharge gate.

14. The apparatus of claim 8 comprising a double-acting lateral actuator operable attached to said laterally positionable tray assembly to position said laterally positionable tray assembly to either side of said longitudinal axis.

15. The apparatus of claim 10 comprising a double-acting lateral actuator operable attached to said laterally positionable tray assembly to position said laterally positionable tray assembly to either side of said longitudinal axis.

16. The apparatus of claim 10 wherein said lateral actuator and said vertical actuator comprise a linear actuator attached to parallel pivoting links operably attached to the rolling support assembly and said laterally positionable tray assembly for simultaneously adjusting the vertical and lateral position of the laterally positionable tray assembly relative to the rolling support assembly.

17. The apparatus of claim 16 wherein said discharge gate is a first discharge gate and said laterally positionable tray assembly comprises a second discharge gate disposed on a second side of said laterally positionable tray assembly opposite said first discharge gate.

18. An apparatus for transporting and discharging a plurality of live poultry, said apparatus comprising:

a rolling support assembly comprising a plurality of wheels configured to provide rolling support of the rolling support assembly, and a front portion and a back portion defining a longitudinal axis;

a laterally positionable tray assembly operably connected to the rolling support assembly, the laterally positionable tray assembly comprising an open-top tray defined by walls of sufficient height to prevent escape of said plurality of live poultry, at least one of said walls being generally parallel to said longitudinal axis and comprising a normally closed discharge gate openable for discharging said plurality of live poultry;

a lateral actuator operably attached to said laterally positionable tray assembly for displacing said laterally positionable tray assembly in a direction lateral to said longitudinal axis of said rolling support assembly, and a discharge actuator operably attached to the laterally positionable tray assembly for biasing said live poultry towards said discharge gate.

19. The apparatus of claim 18 wherein said laterally positionable tray assembly comprises a pivot axis parallel to said longitudinal axis and said discharge actuator is a tilt actuator operably attached to said laterally positionable tray assembly to tilt said laterally positionable tray assembly relative to said rolling support assembly.

20. The apparatus of claim 18 wherein said laterally positionable tray assembly comprises a conveyor and said discharge actuator is a conveyor drive operably attached to a conveyor belt supported by rollers on said tray assembly defining a bottom of said open-top tray.

21. An apparatus for transporting and discharging a plurality of live poultry, said apparatus comprising:

a rolling support assembly comprising a motor operably driving at least one drive wheel, a steering assembly operably connected to at least one steerable wheel, and a front portion and a back portion defining a longitudinal axis;

a laterally positionable tray assembly operably connected to the rolling support assembly by a vertical positioner, the laterally positionable tray assembly comprising a front wall, a back wall, a side discharge gate generally parallel to said longitudinal axis, and a conveyor belt defining an open-top tray, said front wall, back wall, and side discharge gate comprising a height sufficient to prevent escape of said plurality of live poultry and said conveyor belt supported by two rollers to define a laterally-moveable floor of said open-top tray; and a lateral actuator operable attached to said laterally positionable tray assembly for displacing said laterally positionable tray assembly in a direction lateral to said longitudinal axis of said rolling support assembly.

22. The apparatus of claim 21 wherein said discharge gate is a first discharge gate and said laterally positionable tray assembly comprises a second discharge gate along a second side of said open-top tray opposite of said first discharge gate.

23. The apparatus of claim 22 wherein said lateral actuator is a double-acting lateral actuator operably connected to said laterally positionable tray assembly for laterally positioning said laterally positionable tray assembly in either lateral direction relative to said longitudinal axis.

\* \* \* \* \*